R. WHITAKER.
OVERSHOE FOR HORSES.
APPLICATION FILED DEC. 20, 1910.

1,083,968.

Patented Jan. 13, 1914.

2 SHEETS—SHEET 1.

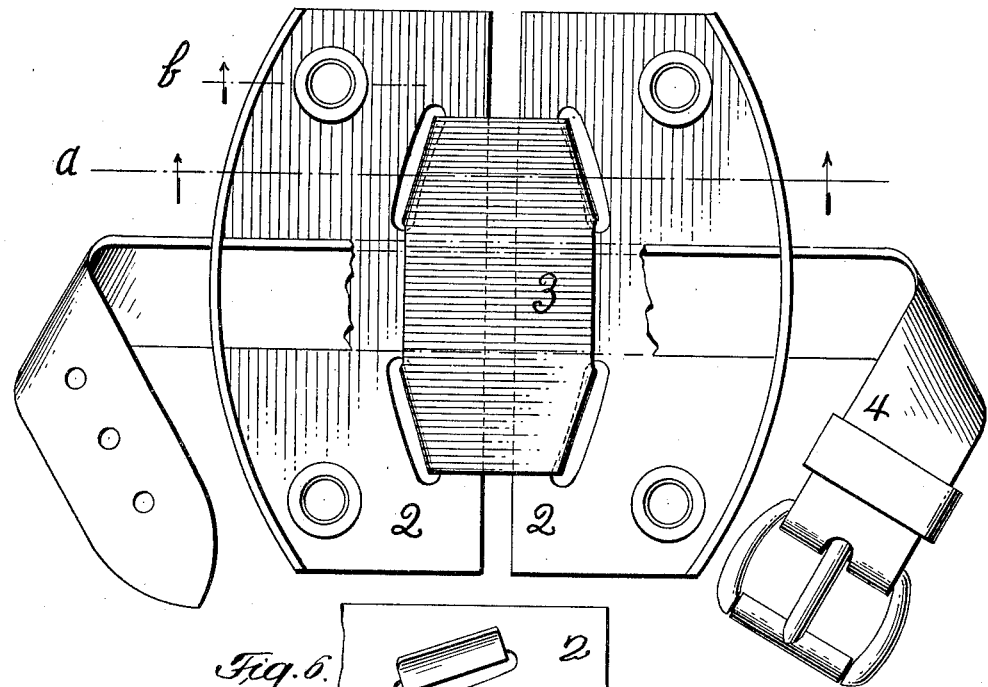
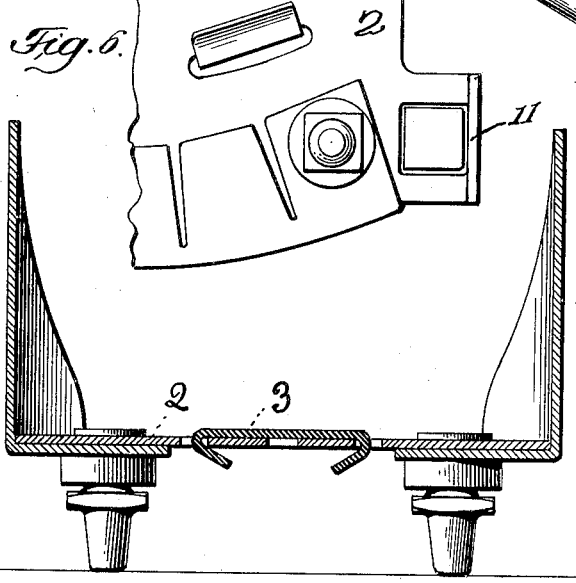
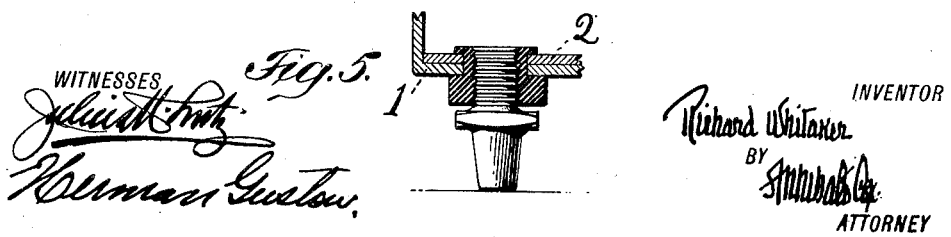

UNITED STATES PATENT OFFICE.

RICHARD WHITAKER, OF NEW BRUNSWICK, NEW JERSEY, ASSIGNOR, BY MESNE ASSIGNMENTS, TO THE EMERGENCY HORSESHOE COMPANY, OF NEW BRUNSWICK, NEW JERSEY, A CORPORATION OF NEW JERSEY.

OVERSHOE FOR HORSES.

1,083,968.     Specification of Letters Patent.     Patented Jan. 13, 1914.

Application filed December 20, 1910. Serial No. 598,391.

*To all whom it may concern:*

Be it known that I, RICHARD WHITAKER, a citizen of the United States, residing at New Brunswick, in the county of Middlesex and State of New Jersey, have invented a new and useful Overshoe for Horses, of which the following is a specification.

The invention comprises a device of simple construction and consequent moderate cost adapted to be easily and quickly applied without disturbing the shoe and when applied effectively to hold against slipping, and the objects of the invention are to provide an inexpensive, effective and convenient means for preventing the horse slipping.

These and other objects are attained by the device shown in the accompanying drawings, in which—

Figure 1:
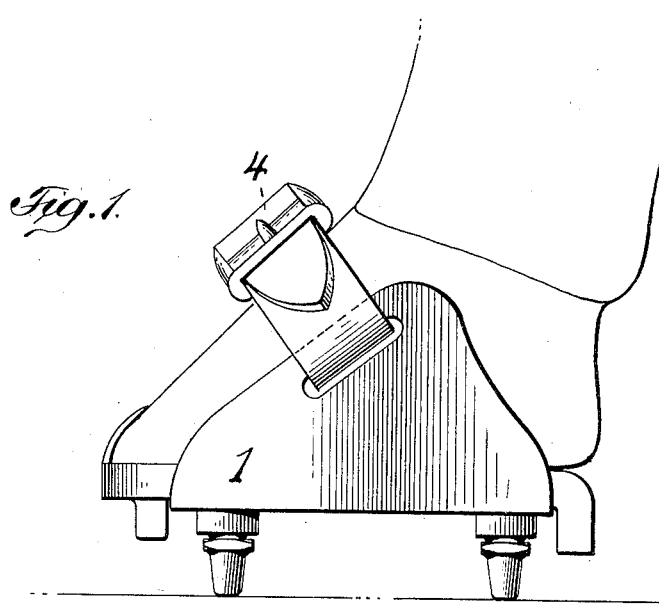
Figure 2:
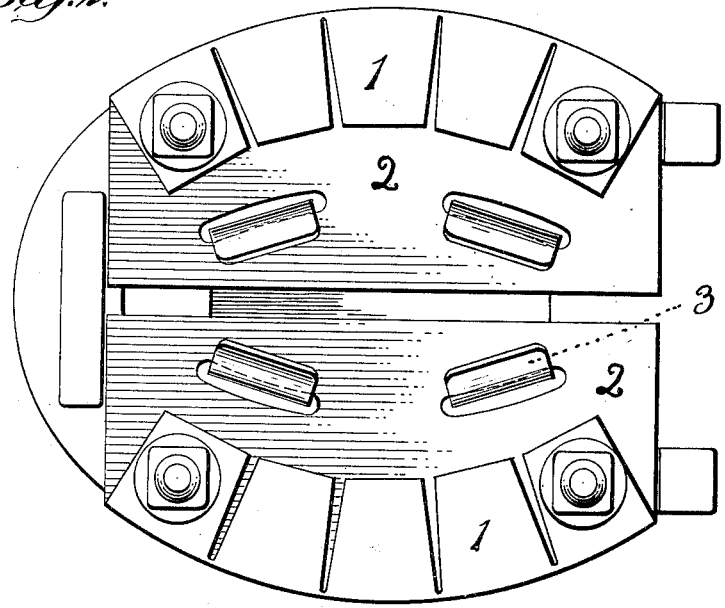

Figure 1 is a side view of the over-shoe applied to the hoof, Fig. 2 a bottom view of the same, Fig. 3 is a top view of the over-shoe, Fig. 4 a sectional view of the same on the line *a* of Fig. 3, Fig. 5 a sectional view on the line *b* of Fig. 3, and Fig. 6 a view of a modification of the plates 2, which I prefer to use under some circumstances as hereinafter pointed out.

The over-shoe comprises two side-pieces each shaped to fit over and bear against a portion of the side and bottom of the hoof or horseshoe, a connecting member extending across the space between the side-pieces at the bottom of the hoof to hold them together under the hoof, and fastening means connecting the side-pieces across an upper part of the hoof; and in its preferred form it embodies also certain important details of construction which increase its value.

In constructing the over-shoe I prefer to stamp the parts out of sheet metal in order to make the device both cheap and strong. The two side-plates 1 are preferably stamped out, curved to accord with the side of the hoof or shoe and bent at the bottom so as to overlap plates 2. The plates 2, which pass under the hoof or shoe, are preferably stamped out and fastened to the side-plates 1 and provided with holes or slots (preferably somewhat slanted, as shown in the drawing, to permit the better fitting of the device to the hoof) adapted to receive the turned portions or tongues of the connecting plate 3. The connecting plate 3 or clasp member, which is adapted to hold the side-pieces together under the hoof, is provided with turned portions adapted to insertion in the holes or slots of the plates 2 and when placed under or over said plates forms with them the bottom of the device. These parts are held in place on the hoof by means of a fastening, as, for example, a strap 4, or a metallic clasping member or other equivalent therefor, applied over an upper part of the hoof.

In the modification shown in Fig. 6 the plate 2 is extended to the rear of the hoof and a hole 10 provided in the extension through which the heel calk of the horseshoe passes and in which it approximately fits, and the extreme rear edge of the plate 2 may be turned up as at 11 so as to provide a bearing against the rear of the horse-shoe or the hoof. The purpose of this is to make the over-shoe applicable to all conditions of use. Usually the horse-shoe is provided with a front fixed calk, as shown in Figs. 1 and 2 of the drawings. In such cases the plates 2 bear against this fixed calk and the over-shoe is thus prevented from slipping forward. Some shoes, however, are not provided with front fixed calks suitable for the purpose. But even such shoes usually have heel calks. The extension of the plate 2 shown in Fig. 6 passing over the heel calk bears against the same and prevents the over-shoe slipping forward in such cases. The turning-up of the rear edge of the extension prevents the over-shoe slipping forward even when there are no calks. Because in many instances when it is desired to put on the over-shoe some or all the fixed calks of the shoe will be found partly or wholly worn down, I prefer to make the over-shoe with the extension and turn-up edge shown in Fig. 6. A piece affixed to the plates 2 so as to bear against the inner surface of the front of the shoe may be used as a substitute, but the means shown in Fig. 6 are preferable.

The construction of the over-shoe obviously admits of considerable variations in details without departing from the scope of the invention and I accordingly point out some of the features which seem to me to be of value.

The device might, of course, be made in various ways, but the fact that it is such that the parts may be stamped out of sheet metal results in giving a saving of cost and the requisite strength.

The side and bottom plates might be fastened together in one of a variety of ways, but the construction shown whereby the rivets serve both to hold these parts together and as bushings for the calks reduces the cost of manufacture and is accordingly advantageous. The calks may be fixed calks formed in or fastened to the plates or made from the rivets which in the preferred form serve as bushings, but the provision for removable calks as shown is advantageous because it permits the device always to be kept in the best condition for use.

The use of a separable connecting plate is particularly advantageous because while the connection between the plates under the hoof might be made by links or by other forms of holding members, the plate is strong and holds firmly and being in this separable form permits the device to be fitted to hoofs or shoes of varying size by simply substituting connecting plates of greater or less width.

The precise form of the connection between the connecting plate and the side-pieces it holds together is in some degree a matter of choice, but the slanted slots shown in the preferred form are advantageous because permitting some slight play and better adjustment in view of the differing shapes of hoofs and shoes.

The over-shoe may be fastened on in various ways, but the provision for an adjustable connection over the front of the hoof, as, for example, the strap shown in the drawings, is advantageous because of convenience in application.

Having thus set forth and explained the nature of the invention, I desire to make plain the fact that modifications in detail such as have been referred to and the like are within the scope of the protection I intend to claim by the following claims:—

1. An over-shoe for horses comprising two side-pieces provided with calks and each shaped to fit over and bear against a portion of the side and bottom of the hoof and horseshoe, and each constructed of two plates held together by rivets which also serve as bushings for calks, a separable metallic plate extending across the space between the side-pieces at the bottom of the hoof to hold them together under the hoof, and fastening means connecting the side-pieces together across an upper part of the hoof.

2. An over-shoe for horses comprising two side-pieces, each shaped to fit over and bear against a portion of the side and bottom of the hoof and horseshoe, and each constructed of two metallic plates held together by rivets which serve also as bushings for calks, a connecting member extending across the space between the side-pieces at the bottom of the hoof to hold them together under the hoof, and fastening means connecting the side-pieces together across an upper part of the hoof.

3. An overshoe for horses, comprising two side pieces extending over the side of the hoof and under the horseshoe, two slotted bottom sections adapted to extend under and bear against the bottom of a horseshoe, calks for the bottom sections, a connecting plate provided with tongues adapted to fit the slots of the bottom section, means for securing the side pieces and bottom sections together, and means for fastening the over-shoe to the hoof.

4. An overshoe for horses, comprising two side pieces extending over the side of the hoof and under the horseshoe and having bottom sections provided with diagonal slots, a clasp member provided with tongues to engage said slots and secure the bottom sections together under the horseshoe and means for fastening the overshoe to the hoof.

5. An overshoe for horses, comprising side plates having an angled portion adapted to extend under the horseshoe, separate bottom plates attached thereto and having means to coöperate with a clasp, calks for the said bottom plates, a connecting clasp for said bottom plates, and means for securing the overshoe to the hoof.

6. An over-shoe for horses comprising two spaced side-pieces each shaped to fit over and bear against a portion of the side and bottom of the hoof and horseshoe and having a bearing against the heel of the shoe to prevent forward movement, a connecting plate extending transversely across the space between the side-pieces at the bottom of the hoof to hold them together under the hoof, and fastening means connecting the side-pieces together across the front of the hoof.

7. An over-shoe for horses comprising two spaced side-pieces each shaped to fit over and bear against a portion of the side and bottom of the hoof or horseshoe and having a hole therein adapted to fit over the heel calk of the shoe and having a bearing against the heel of the shoe to prevent forward movement, a connecting plate extending transversely across the space between the side-pieces at the bottom of the hoof to hold them together under the hoof, and fastening means connecting the side-pieces together across the front of the hoof.

Signed at New Brunswick, in the county of Middlesex and State of New Jersey, this 19th day of December, 1910.

RICHARD WHITAKER.

Witnesses:
GEO. F. MCCORMICK,
FRED M. JOINER.

Copies of this patent may be obtained for five cents each, by addressing the "Commissioner of Patents, Washington, D. C."